United States Patent
Al Faruque et al.

(10) Patent No.: US 10,129,022 B1
(45) Date of Patent: Nov. 13, 2018

(54) SECRET KEY FOR WIRELESS COMMUNICATION IN CYBER-PHYSICAL AUTOMOTIVE SYSTEMS

(71) Applicant: The Regents of the University of California, Oakland, CA (US)

(72) Inventors: Mohammad Abdullah Al Faruque, Irvine, CA (US); Jiang Wan, Irvine, CA (US); Anthony Lopez, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/439,102

(22) Filed: Feb. 22, 2017

Related U.S. Application Data

(60) Provisional application No. 62/298,122, filed on Feb. 22, 2016.

(51) Int. Cl.
  *H04L 29/06* (2006.01)
  *H04L 9/08* (2006.01)
  *H04W 12/08* (2009.01)

(52) U.S. Cl.
  CPC ........ *H04L 9/0869* (2013.01); *H04L 63/0428* (2013.01); *H04W 12/08* (2013.01)

(58) Field of Classification Search
  None
  See application file for complete search history.

(56) References Cited

U.S. PATENT DOCUMENTS

| | | | | |
|---|---|---|---|---|
| 5,109,152 A * | 4/1992 | Takagi | ................ | G06Q 20/341 235/375 |
| 7,120,249 B2 * | 10/2006 | Roberts | ................ | H04L 9/0869 380/44 |
| 8,280,046 B2 * | 10/2012 | Rudolf | ................ | H04L 9/0841 380/255 |
| 8,862,884 B2 * | 10/2014 | Hennebert | ............ | H04L 9/0875 713/150 |
| 2002/0056041 A1 * | 5/2002 | Moskowitz | ........... | H04L 9/3236 713/176 |
| 2008/0044011 A1 * | 2/2008 | Yoshida | ................ | H04L 1/0045 380/28 |

(Continued)

OTHER PUBLICATIONS

X. Lin, R. Lu, C. Zhang, H. Zhu, P.-H. Ho, and X. Shen, "Security in vehicular ad hoc networks," Communications Magazine, IEEE, pp. 88-95, 2008.

(Continued)

*Primary Examiner* — Maung T Lwin
(74) *Attorney, Agent, or Firm* — Nguyen & Tarbet Patent Law Firm

(57) ABSTRACT

A key generation technique exploiting the randomness of a wireless channel to generate secret keys to secure automotive wireless communication using symmetric cryptography is presented. Moreover, the algorithm of the present technique solves the challenging key exchange problem in automotive wireless communication with low costs in terms of performance and code size. As demonstrated, the proposed algorithm can generate secret keys with 67% average min-entropy. Furthermore, the proposed technique can achieve up to 10× performance and 20× code size reduction in comparison to the state-of-the-art hybrid cryptographic algorithms.

20 Claims, 11 Drawing Sheets

(56) References Cited

U.S. PATENT DOCUMENTS

| | | | | |
|---|---|---|---|---|
| 2009/0225982 | A1* | 9/2009 | Yener | H04L 63/06 380/44 |
| 2009/0285389 | A1* | 11/2009 | Matsuo | H04L 9/321 380/30 |
| 2011/0191129 | A1* | 8/2011 | Moriya | G06Q 10/063 705/7.11 |
| 2012/0317417 | A1* | 12/2012 | Hennebert | H04L 9/0875 713/171 |
| 2013/0236007 | A1* | 9/2013 | Munro | H04L 9/0861 380/44 |
| 2013/0326224 | A1* | 12/2013 | Yavuz | H04L 9/3247 713/176 |
| 2014/0289520 | A1* | 9/2014 | Tanizawa | H04L 45/14 713/168 |
| 2016/0013941 | A1* | 1/2016 | Gungor | H04L 9/0872 380/44 |

OTHER PUBLICATIONS

J. Zhang and V. Varadharajan, "Wireless sensor network key management survey and taxonomy," Journal of Network and Computer Applications, pp. 63-75,2010.

O. Hyncica, P. Kucera, P. Honzik, and P. Fiedler, "Performance evaluation of symmetric cryptography in embedded systems," Intelligent data acquisition and advanced computing systems (IDAACS), 2011 IEEE 6th international conference on, pp. 277-282, 2011.

N. Beckmann and M. Potkonjak, Hardware-based public-key cryptography with public physically unclonable functions;' Information Hiding, pp. 206-220, 2009.

T. Aono, K. Higuchi, T. Ohira, B. Komiyama, and H. Sasaoka, "Wireless secret key generation exploiting reactance-domain scalar response of multi path fading channels," Antennas and Propagation, IEEE Transactions on, vol. 53, No. 11, pp. 3776-3784, 2005.

Pretschner, M. Broy, I. H. Kruger, and T. Stauner, "Software engineering for automotive systems: A roadmap," in 2007 Future of Software Engineering. IEEE Computer Society, 2007, pp. 55-71.

A. Sangiovanni-Vincenteili and M. Di Natale, "Embedded system design for automotive applications," Computer, No. 10, pp. 42-51, 2007.

G. Leen and D. Heffernan, "Vehicles without wires," Computing & Control Engineering Journal, vol. 12, No. 5, pp. 205-211, 2001.

Dixon, V. Kalinin, J. Beckley, and R. Lohr, "A second generation in-car tire pressure monitoring system based on wireless passive saw sensors," in International Frequency Control Symposium and exposition, 2006 IEEE. IEEE, 2006, pp. 374-380.

S. Al-Sultan, M. M. Al-Doori, A. H. Al-Bayatti, and H. Zedan, "A comprehensive survey on vehicular ad hoc network," Journal of network and computer applications, vol. 37, pp. 380-392, 2014.

M. Torrent-Moreno, J. Mittag, P. Santi, and H. Hartenstein, "Vehicle-to-vehicle communication: fair transmit power control for safety-critical information," Vehicular Technology, IEEE Transactions on, vol. 58, No. 7, pp. 3684-3703, 2009.

J. Undercoffer, S. Avancha, A. Joshi, and J. Pinkston, "Security for sensor networks," in CADIP Research Symposium. Citeseer, 2002, pp. 25-26.

L. Eschenauer and V. D. Gligor, "A key-management scheme for distributed sensor networks," in Proceedings of the 9th ACM conference on Computer and communications security. ACM, 2002, pp. 41-47.

T. K. Sarkar, Z. Ji, K. Kim, A. Medouri, and M. Salazar-Palma, "A survey of various propagation models for mobile communication," Antennas and Propagation Magazine. IEEE, vol. 45, No. 3, pp. 51-82,2003.

P. Koeberl, J. Li, A. Rajan, and W. Wu, "Entropy loss in puf-based key generation schemes: The repetition code pitfall," Hardware-Oriented Security and Trust (HOST), 2014 IEEE International Symposium on, pp. 44-49, 2014.

N. Smart, Ecrypt ii yearly report on algorithms and keysizes; Tech. Rep., European Network of Excellence in Cryptology II, 2012.

S. Park, Y. Kim, and N. Chang, "Hybrid Energy Storage Systems and Battery Management for Electric Vehicles," DAC'13 Proceedings of the Design Automation Conference, pp. 1-6,2013.

Texas Instruments, "Msp430f15x, msp43Ofl6x, msp43Ofl6lx mixed signal microcontroller datasheet," 2014.

Atmel, "8-bit avr microcontroller with 32kbytes in-system programmable flash," 2014.

Freescale Semiconductor, "Mc9s08qa4 series datasheet," 2014.

B. Azimi-Sadjadi, A. Kiayias, A. Mercado, and B. Yener. Robust Key Generation From Signal Envelopes in Wireless Networks. In Proceedings of the 14th ACM Conference on Computer and Communications Security, pp. 401-410. ACM, 2007.

E. Barker, W. Barker, W. Burr, W. Polk, and M. Smid. Recommendation for key management-part 1: General (revised). In NIST Special Publication. Citeseer, 2007.

E. Barker and A. Roginsky. Transitions: Recommendation for Transitioning the Use of Cryptographic Algorithms and Key Lengths. NIST Special Publication, p. 131A, 2011.

M. Bloch, J. Barros, M.R. Rodrigues, and S.W. McLaughlin. Wireless Information-Theoretic Security. IEEE Transactions on Information Theory, pp. 2515-2534, 2008.

S. Bono, M. Green, A. Stubblefield, A. Juels, A.D. Rubin, and M. Szydlo. Security Analysis of a Cryptographically-Enabled RFID Device. In USENIX Security, vol. 5, pp. 1-16, 2005.

S. Checkoway, D.McCoy, B. Kantor, D. Anderson, H. Shacham, S. Savage, K. Koscher, A. Czeskis, F. Roesner, T. Kohno, et. al. Comprehensive Experimental Analyses of Automotive Attack Surfaces. USENIX Security Symposium, 2011.

K. Dar, M. Bakhouya, J. Gaber, M. Wack, and P. Lorenz. Wireless Communication Technologies for its Applications. Communications Magazine, IEEE, 48(5):156-162, 2010.

M. Edman, A. Kiayias, and B. Yener. On Passive Inference Attacks Against Physical-Layer Key Extraction. In Proceedings of the Fourth European Workshop on System Security, p. 8. ACM, 2011.

T. Elbatt, C. Saraydar, M. Ames, and T. Talty. Potential for Intra-Vehicle Wireless Automotive Sensor Networks. In Sarnoff Symposium, 2006 IEEE, pp. 1-4. IEEE, 2006.

Intelligent Transport Systems (ITS); Security; Threat, Vulnerability and Risk Analysis (TVRA). Technical Report, ETSI TR 102 893, European Telecommunications Standards Institute, 2010.

N. Gura, A. Patel, A. Wander, H. Eberle, and S.C. Shantz. Comparing Elliptic Curve Cryptography and RSA on 8-bit CPUS. In Cryptographic Hardware and Embedded Systems-CHES 2004, pp. 119-132. Springer, 2004.

J. Harding, G. Powell, R. Yoon, J. Fikentscher, C. Doyle, D. Sade, M. Lukuc, J. Simons, and J. Wang. Vehicle-to-vehicle communications: Readiness of V2V Technology for Application. Technical Report, 2014.

D. Hofheinz and E. Kiltz. Secure Hybrid Encryption From Weakened Key Encapsulation in Advances in Cryptology-Crypto 2007, pp. 553-571. Springer, 2007.

D.E. Holcomb, W.P. Burleson, and K. Fu. Power-Up SRAM State as an Identifying Fingerprint and Source of True Random Numbers. IEEE Transactions on Computers, 58(9):1198-1210, 2009.

S. Jana, S.N. Premnath, M.Clark, S.K. Kasera, N. Patwari, and S.V. Krishnamurthy. On the Effectiveness of Secret Key Extraction from Wireless Signal Strength in Real Environments. In Proceedings of the 15th Annual International Conference on Mobile Computing and Networking, pp. 321-332. ACM, 2009.

F. Kargl, P. Papadimitratos, L Buttyan, M. Muter, E. Schoch, B. Wiedersheim, T.V. Thong, G. Calandriello, A. Held, A. Kung, et. al. Secure Vehicular Communication Systems: Implementation, Performance, and Research Challenges. Communications Magazine, IEEE, 46(11)110-118, 2008.

J. Lee Rodgers and W.A. Nicewander. Thirteen Ways to Look at the Correlation Coefficient. The American Statistician, 42(1):59-66, 1988.

C.-W. Lin, L. Rao, P. Giusto, J. D'Ambrosio, and A. Sangiovanni-Vincentelli. An Efficient Wire Routing and Wire Sizing Algorithm for Weight Minimization of Automotive Systems. Proceedings of the 51st Annual Design Automation Conference (DAC'14), pp. 1-6, 2014.

(56) References Cited

OTHER PUBLICATIONS

S. Mathur, W. Trappe, N. Mandayam, C. Ye, and A. Reznik. Radio-Telepathy: Extracting a Secret Key from an Unauthenticated Wireless Channel. Proceedings of the 14th ACM International Conference on Mobile Computing and Networking, pp. 128-139, 2008.
MathWorks. MATLAB, Simulink. www.mathworks.com, 2014.
C. Miller and C. Valasek. A Survey of Remote Automotive Attack Surfaces. Black Hat USA, 2014.
M.A. Moharrum and A.A. Al-Daraiseh. Toward Secure Vehicular Ad-Hoc Networks: A Survey. IETE Technical Review, 29(1): 80-89, 2012.
O'Donnell, G.E. Suh, and S. Devadas. PUF-Based Random No. Generation. In MIT CSAIL CSG Technical Memo, 2004.
N. Patwari, J Croft, S. Jana, and S.K. Kasera. High-Rate Uncorrelated Bit Extraction for Shared Secret Key Generation from Channel Measurements. IEEE Transactions on Mobile Computing, 9(1):17-30, 2010.
N.R. Potlapally, S. Ravi, A. Raghunathan, and N.K. Jha. A Study of the Energy Consumption Characteristics of Cryptographic Algorithms and Security Protocols. IEEE Transactions on Mobile Computing, 5(2):128-143, 2006.
S.N. Premnath, J. Croft, N. Patwari, and S.K. Kasera. Efficient High-Rate Secret Key Extraction in Wireless Sensor Networks Using Collaboration. ACM Transactions on Sensor Networks (TOSN), p. 2, 2014.
Y. Qian and N. Moayeri. Design of Secure and Application-Oriented VANETs. In Vehicular Technology Conference, 2008. VTC Spring 2008. IEEE, pp. 2794-2799. IEEE, 2008.
K. Ren, H. Su, and Q. Wang. Secret Key Generation Exploiting Channel Characteristics in Wireless Communications. Wireless Communications, IEEE, 18(4):6--12, 2011.
M. Rostami, J.B. Wendt, M. Potkonjak, and F. Koushanfar. Quo Vadis, Puf?: Trends and Challenges of Emerging Physical-Disorder Based Security. Proceedings of the Design, Automation and Test in Europe Conference and Exhibition 2014 (Date'14), p. 352, 2014.
T. Schutze. Automotive Security: Cryptography for Car2x Communication. In Embedded World Conference. Citeseer, 2011.
H. Schweppe, Y. Roudier, B. Weyl, L. Apvrille, and D. Scheuermann. Car2x Communication: Securing the Last Meter-A Cost-Effective Approach for Ensuring Trust in Car2x Applications Using In-Vehicle Symmetric Cryptography. In Vehicular Technology Conference (VTC Fall), 2011 IEEE, pp. 1-5. IEEE, 2011.
M.K. Simon and M.S. Alouini. Digital Communication Over Fading Channels. John Wiley & Sons, 2005.
G.E. Suh and S. Devadas. Physical Unclonable Functions for Device Authentication and Secret Key Generation. Proceedings of the 44th annual Design Automation Conference (DAC'07), pp. 9-14, 2007.
R. Van Den Berg. Entropy Analysis of Physical Unclonable Functions. PhD Thesis, MSc. Thesis, Eindhoven University of Technology, 2012.
J. Wan, A. Canedo, A. Faruque, and M. Abdullah. Functional Model-Based Design Methodology for Automotive Cyber-Physical Systems. IEEE Systems Journal, 2014.
Q. Wang, H. Su, K Ren, and K. Kim. Fast and Scalable Secret Key Generation Exploiting Channel Phase Randomness in Wireless Networks. INFOCOM, 2011 Proceedings IEEE, pp. 1422-1430. IEEE, 2011.
C. Weiss V2x Communication in Europe-from Research Projects towards Standardization and Field Testing of Vehicle Communication Technology. Computer Networks, 55(14): 3103-3119, 2011.
D. Work, A. Bayen, and Q. Jacobson. Automotive Cyber Physical Systems in the Context of Human Mobility. National Workshop on High-Confidence Automotive Cyber-Physical Systems, pp. 3-4, 2008.
C. Ye, S. Mathur, A. Reznik, Y. Shah, W. Trappe, and N.B. Mandayam. Information-Theoretically Secret Key Generation for Fading Wireless Channels. IEEE Transactions on Information Forensics and Security, pp. 240-254, 2010.
B. Zan, M. Gruteser, and F. Hu. Key Agreement Algorithms for Vehicular Communication Networks Based on Reciprocity and Diversity Theorems. IEEE Transactions on Vehicular Technology, 62(8): 4020-4027, 2013.
K. Zeng, D. Wu, A.J. Chan, and P. Mohapatra. Exploiting Multiple-Antenna Diversity for Shared Secret Key Generation in Wireless Networks. INFOCOM, 2010 Proceedings IEEE, pp. 1-9. IEEE, 2010.
K. Jiang, P. Eles, and Z. Peng, "Co-design techniques for distributed real-time embedded systems with communication security constraints," Proceedings of the Design, Automation and Test in Europe Conference and Exhibition 2012 (Date'12), pp. 947-952, 2012.
P. Papadimitratos, A. La Fortelle, K Evenssen, R. Brignolo, and S. Cosenza, "Vehicular communication systems: Enabling technologies, applications, and future outlook on intelligent transportation," Communications Magazine, IEEE, vol. 47, No. 11, pp. 84-95, 2009.
P. Papadimitratos, L Buttyan, T. S. Holczer, E. Schoch, J. Freudiger, M. Raya, Z. Ma, F. Kargl, A. Kung, and J.-P. Hubaux, "Secure vehicular communication systems: design and architecture," Communications Magazine, IEEE, vol. 46, No. 11, pp. 100-109,2008.
F. Qu, F.-Y. Wang, and L. Yang, "Intelligent transportation spaces: vehicles, traffic, communications, and beyond," Communications Magazine, IEEE, vol. 48, No. 11, pp. 136-142, 2010.
F. Bai, T. Elbatt, G. Hollan, H. Krishnan, and V. Sadekar, "Towards characterizing and classifying communication-based automotive applications from a wireless networking perspective," in Proceedings of IEEE Workshop on Automotive Networking and Applications (AutoNet), 2006, pp. 1-25.
M. Ahmed, C. U. Saraydar, T. Elbatt, J. Yin, T. Talty, and M. Ames, "Intra-vehicular wireless networks," in Globecom Workshops, 2007 IEEE. IEEE, 2007, pp. 1-9.
R. N. Charette, "This car runs on code," IEEE Spectrum, vol. 46, No. 3, p. 3, 2009.
G. Han, H. Zeng, Y. Li, and W. Dou, "Safe: Security-Aware Flexray Scheduling Engine," Proceedings of the Design, Automation and Test in Europe Conference and Exhibition 2014 (Date'14), pp. 1-4,2014.
I. Rouf, R. Miller, H. Mustafa, S. Oh, Travis Taylor, W. Xu, M. Gruteser, W. Trappe, and I. Seskar, "Security and privacy vulnerabilities of in-car wireless networks: A tire pressure monitoring system case study," 19th USENIX Security Symposium, Washington DC, pp. 11-13, 2010.

\* cited by examiner

SECRET KEY FOR WIRELESS COMMUNICATION IN CYBER-PHYSICAL AUTOMOTIVE SYSTEMS

CROSS REFERENCE

This application claims priority to U.S. Patent Application No. 62/298,122, filed Feb. 22, 2016, the specification(s) of which is/are incorporated herein in their entirety by reference.

FIELD OF THE INVENTION

The present invention relates to the security of wireless communication protocols in automotive cyber-physical systems (CPSs), more specifically, to systems and methods that exploit the randomness of a wireless channel to generate keys for an automotive CPS.

BACKGROUND OF THE INVENTION

Wireless technologies are widely implemented in automotive Cyber Physical Systems (CPSs) for infotainment applications such as navigation schemes, hands-free calling, and satellite radio. However, due to the wire harnessing problem, recent intra-vehicular sensor networks are also adopting wireless technology to greatly reduce the total weight of the vehicle and the complexity of adding newer features during the design time. As a result, using wireless technology may greatly enhance the functionality and efficiency of the automotive CPS. As an example, Tire Pressure Monitoring Systems (TPMS) use wireless sensors to inform both the automotive system and passengers about valuable information such as temperature and tire pressure. Applying wireless technology to detect collisions is a promising solution to increasing traffic efficiency and reducing the number of accidents, where more than 80% are caused by drivers. For this reason, national agencies such as the U.S. Department of Transportation are developing Vehicle-to-Vehicle (V2V) and Vehicle-to-Infrastructure (V2I) communications to provide entertainment, road condition information, collision detection and avoidance measures, all of which can enable the realistic use of autonomous driving. FIG. 4 provides an illustration for such a scenario.

This new paradigm dealing with the connection between traditionally isolated automotive systems and the outside world over insecure wireless channels introduces several security concerns such as leakage of private information of passengers and direct influence over the automotive system's behavior. In fact, this type of security concern began in the mid-1990s when many automotive systems used Remote Keyless Entry (RKE). Afterward, in 2005, a successful Texas Instrument transponder hack indicated a potential security threat to millions of automobiles. And more recently in 2010, researchers demonstrated the possibility of an attack that captures and reads TPMS communication packets from an automobile up to 40 meters away. They also presented the capability of injecting fake packets to trigger the target automobile's TPMS warning signal. Since incoming safety-critical V2V/V2I applications will also inherit these aforementioned security challenges and concerns, researchers from the European Telecommunications Standards Institute (ETSI) proposed the following security objectives for these applications: confidentiality, integrity, availability, accountability, and authenticity.

To summarize, for wireless communication in automotive CPS, messages will need to be authenticated and sometimes encrypted depending on the confidentiality requirements of applications. As a simple example, account information will need to be encrypted in applications like Electronic Toll Collection (ETC). It is important to note that these security objectives apply to resource-limited (in terms of computational power, energy consumption and memory size) time-critical embedded devices (such as micro-controllers, sensor-nodes, etc.) and resource-limited non-time-critical devices (infotainment systems). The focus of the present invention is the former of these two device types: resource-limited and time-critical.

A typical automotive design needs to provide security for about 20 years or more, implying the necessity of a reliable cryptographic design to achieve the aforementioned security objectives. Cryptographic algorithms fall under two categories: asymmetric and symmetric. As seen in Table I, symmetric algorithms (like Advanced Encryption Standard ("AES")) have very high performance and smaller energy overhead in comparison to asymmetric algorithms (like Rivest-Shamir-Adleman ("RSA") and Elliptic Curve Cryptography ("ECC")). However, the major problem of using symmetric algorithms is that both communicating parties must share a secret key before any secure communication. Therefore, secret key exchange is considered as a challenging problem in automotive wireless applications. Although asymmetric algorithms do not require a shared secret key for secure communication, they are too slow for most of the time-critical automotive CPS applications, and they also consume more computational power and more memory space in comparison to other algorithms.

TABLE I

Comparison of Existing Cryptographic Algorithms

| | Symmetric | Asymmetric | Hybrid |
|---|---|---|---|
| Authentication | Message Authentication Code (MAC) | Digital signature | Digital signature on keys MAC on data |
| Confidentiality | Encryption of data | Encryption of small data | Encrypt keys with Asym. Encrypt of data with Sym. |
| Performance | Very fast | Slow | Medium |
| Code size | Thousands of bytes | Thousands of bytes | Thousands of bytes |
| Key size | 32-256 bits | ECC: 2.56-384 bits RSA: 1024-3072 bits | 512-3072 bits for Asym. 32-256 bits for Sym. |
| Key management | Random key generation Pre-shared secret key | None | Random key generation |

In the current state-of-the-art approach, research groups and government organizations are proposing the use of hybrid solutions, where a symmetric key is generated from a random number generator or a Key Encapsulation Mechanism (KEM) and exchanged through an asymmetric algorithm. As a result, higher performance can be achieved with symmetric encryption of both small and large data.

There are still three major limitations in the current hybrid approach. First, this solution requires a key exchange session using an asymmetric algorithm before the data transmission session. This overhead is estimated to be up to several seconds and is generally not acceptable for safety related applications, which require a reaction time of 50 to 200 milliseconds. Second, the hybrid solution requires an implementation of asymmetric algorithm in the embedded devices, thus causing non-negligible memory space overhead. Third, similar to symmetric algorithms, the hybrid solution generally needs a random number generator that produces symmetric keys with high entropy. Traditionally, the generation of random bits relies on a software-based pseudo random number generator or user given inputs. This approach, however, cannot provide enough entropy (where entropy is the quantified value of the randomness for a set of bits) due to its high level of predictability and determinism.

To solve this problem, researchers have been looking toward physical randomness as a high entropy source for random number generation. One of the products of their ideas is the Physical Unclonable Function (PUF), a function based on physical characteristics that are practically impossible to be duplicated by any attackers. Recently, researchers have proposed to use PUFs that can generate secret keys by extracting randomness from the physical environment. Similarly, it is possible to use the wireless communication channel as a source of physical randomness to generate secret keys. Most of the state-of-the-art theories and practical methods for generating secret keys using physical characteristics of the wireless channel have been proposed within the last decade.

The success of generating dynamic keys from the wireless communication depends on three properties: 1) reciprocity of the radio wave propagation, 2) temporal variations, and 3) spatial variations in the wireless channel. Besides most of the theoretical works, some practical implementations have been demonstrated in sensor network applications, and they rely on the Multiple-Input and Multiple-Output (MIMO) approach or collaborations among multiple wireless nodes to create secret keys with higher entropy. An implementation on V2V/V2I applications has been demonstrated in the art. However, it mainly focuses on the comparison between different key generation algorithms and adequately model the spatial and temporal variations of the automotive wireless channel.

In summary, solving the limitations of the above-mentioned state-of-the-art approaches poses the following key challenges:
1. Finding a reliable high entropy source to generate secret keys for symmetric cryptographic algorithms, for ensured secure wireless communication in automotive CPS.
2. Finding a low cost solution in terms of performance and memory size for the exchange of symmetric keys in automotive CPS.

To address the above-mentioned challenges, a novel technique to generate symmetric keys from the physical randomness of automotive wireless communication under tight memory and performance budgets is proposed. The present invention is the first to demonstrate, through realistic automotive modeling, simulation and experiments, that higher level of entropy may be obtained from the moving and changing environment to generate symmetric secret keys for automotive CPS wireless communication practically.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the subsequent detailed description and claims.

SUMMARY OF THE INVENTION

In one embodiment, the present invention features a method of generating a key to effectively secure wireless communications between two communication nodes. A first cyber-physical system is disposed within the first communication node and a second cyber-physical system is disposed within the second communication node. Each cyber-physical system may perform an encryption and decryption of the wireless communications. In one embodiment, the key generator is one that is physical layer-based, and can generate a key used for cryptographic purposes.

In some embodiments, in order to generate the key of length $K_{length}$, a predefined group of probe signals, of predefined size $G_{size}$, may be sent from a first communication node to a second communication node and received back via a wireless channel. The group of probe signals traverses the wireless channel in order to evaluate the randomness of the channel gain and allow for a collection of a plurality of received signal strength ("RSS") values.

In additional embodiments, the low frequency parts of the plurality of collected RSS signals are filtered with a high-pass filter defined by an impulse frequency response of the communication channel with respect to time, $H_{highpass(t)}$. The filtered signal values, $RSS_{filtered}$, contain all the information needed to extract the key of required length $K_{length}$. Next, an upper threshold, $Th_{up}$, and a lower threshold, $Th_{lo}$, based on the mean and variation of the plurality of filtered RSS signals may be calculated. The set of bits may be generated by assigning each filtered RSS value greater than $Th_{up}$ to 1, assigning each filtered RSS value less than $Th_{lo}$ to 0, and discarding each filtered RSS value between $Th_{up}$ and $Th_{lo}$. All of the bits may then be collected and the key, having length L, is generated. A mismatch check may be performed to remove any mismatching bits within the key using the index of each bit. In additional embodiments, after the key has been generated, the length of the key may be verified. If L is less than $K_{length}$, then the method iterates again until L is greater than or equal to $K_{length}$. The key can be used by the first and second cyber-physical systems to encrypt and decrypt the wireless communications between the first and second communication nodes.

In supplementary embodiments, in order to maintain a low bit mismatch rate, each probe signal must be exchanged within the coherence time of the wireless channel. Additionally, in order to keep bits comprising the generated key unrelated, the time interval, $\tau_{step}$, between exchanging each probe signal must be no less than $T_c$. In other embodiments, the plurality of RSS signals must be collected within a time interval $G_{size} \times \tau_{step}$.

The key generating method may also comprise an energy and performance-aware optimization technique. This optimization provides optimized values for security-related design time decisions, such as the type of cryptographic algorithm. In a non-limiting embodiment, the optimization is formulated as a linear optimization problem to be minimized:

$$W_1*(KeyGenOHR_p+CryptOHR_p)+W_2*(KeyGenOHR_e+CryptOHR_e),$$

wherein $W_1$ is a pre-defined weight performance, $W_2$ is a predefined energy overhead, KeyGenO H $R_p$ is a key generation performance overhead, KeyGenO H $R_e$ is a key generation energy overhead, CryptO H $R_p$ is a cryptographic algorithm performance overhead and CryptO H $R_e$ is a cryptographic algorithm energy overhead, wherein solving the linear optimization problem provides an optimized solution for the cryptographic algorithm, the $K_{length}$ and a time interval for which the cryptographic algorithm or the key is effective.

In some embodiments, the first communication node is a vehicle or infrastructure. In other embodiments, the second communication node is a vehicle or infrastructure.

In another embodiment, the present invention further features a system for generating a key to effectively secure wireless communications between two communication nodes. A first cyber-physical system may be disposed at the first communication node, such as a vehicle or infrastructure, and a second cyber-physical system may be disposed at the second communication node, such as a vehicle or infrastructure. In some embodiments, each cyber-physical system may perform an encryption and decryption of the automotive communications transmitted and received between the two nodes.

In other embodiments, the system features a first transceiver disposed at the first communication node; a second transceiver disposed at the second communication node, and is linked to the first transceiver by a wireless channel; a processor, operatively coupled to the first transceiver; and a memory operatively coupled to the processor, configured to store digitally-encoded instructions that, when executed by processor, cause the processor to perform operations.

In some embodiments, the operation may comprise sending and receiving a predefined group of probe signals, of predefined size ("$G_{size}$"), between first transceiver and the second transceiver via the wireless channel, wherein the group of probe signals are sent for evaluating randomness of a channel gain of the wireless channel; extracting or collecting a plurality of received signal strength ("RSS") values from the wireless channel; obtaining a plurality of filtered RSS signals by filtering the plurality of RSS signals with a high-pass filter defined by an impulse frequency response of the wireless channel, wherein the plurality of filtered RSS signals contain information needed to generate the key of required length, $K_{length}$; generating a set of bits, comprising calculating an upper threshold, $Th_{up}$, and a lower threshold, $Th_{lo}$, based on a mean and a variation of the plurality of filtered RSS signals, and assigning each filtered RSS value greater than $Th_{up}$ to 1 and assigning each filtered RSS value less than $Th_{lo}$ to 0, wherein each filtered RSS value between $Th_{up}$ and $Th_{lo}$ is discarded; generating the key having a length L, by collecting the set of bits; and verifying a length, L, of the key. If L is less than $K_{length}$, the operations are repeated until L is greater than or equal to $K_{length}$. Once the key of appropriate size is formed, the key may be used by each cyber-physical system to encrypt and decrypt information communicated between the two communication nodes.

In one embodiment, each probe signal is exchanged within a time period less than a coherence time ("$T_c$") of the wireless channel between the first communication node and the second communication node. In another embodiment, a time interval ("$\tau_{step}$") between exchanging each probe signal is not less than $T_c$. In a preferred embodiment, the plurality of RSS values is collected within time period defined by $G_{size} \times \tau_{step}$.

In some embodiments, the operations performed by the processor may further comprise performing a mismatch check to remove one or more mismatch bits from the set of bits of the key.

In other embodiments, the operations performed by the processor may further comprise determining and applying an energy and performance-aware optimization, wherein said optimization is formulated as a linear optimization problem to be minimized, wherein said linear optimization problem to be minimized is:

$$W_1*(KeyGenOHR_p+CryptOHR_p)+W_2*(KeyGenOHR_e+CryptOHR_e),$$

wherein $W_1$ is a pre-defined weight performance, $W_2$ is a predefined energy overhead, KeyGenO H $R_p$ is a key generation performance overhead, KeyGenO H $R_e$ is a key generation energy overhead, CryptO H $R_p$ is a cryptographic algorithm performance overhead and CryptO H $R_e$ is a cryptographic algorithm energy overhead, wherein solving the linear optimization problem provides an optimized solution for the cryptographic algorithm, the $K_{length}$, and a time interval for which the cryptographic algorithm or the key is effective.

Currently existing systems and methodologies have inherent limitations and as such they cannot provide enough entropy (e.g. randomness) when generating secret keys for encrypting and decrypting wireless communication between two communication nodes.

Without wishing to limit the invention to a particular theory or mechanism, the present invention is capable of generating keys having a high entropy source. The following non-limiting inventive features enable the system to use randomness extracted from the wireless communication channel used by the two communication nodes as the entropy source:
- acquisition of the channel gain of the wireless channel;
- extraction of a plurality of received signal strength ("RSS") values from the wireless channel containing information needed to generate the key;
- generation of a set of bits comprising the key by calculating an upper threshold, $Th_{up}$, and a lower threshold, $Th_{lo}$, based on a mean and a variation of the plurality of filtered RSS signals; and
- determination of an energy and performance-aware optimization formulated as a linear optimization problem to be minimized, where solving the linear optimization problem provides an optimized solution for an optimal length of the key and a time interval for which the key is effective.

BRIEF DESCRIPTION OF THE DRAWINGS

The features and advantages of the present invention will become apparent from a consideration of the following detailed description presented in connection with the accompanying drawings in which.

DEFINITIONS

As used herein, the term "cyber physical system" or "CPS" refers to an integration of computation, networking and physical processes. CPSs provide infotainment applications such as navigation schemes, hands-free calling, and satellite radio to automotive vehicles. CPSs may also enhance vehicles' functionality and efficiency, (e.g., an automated tire pressure monitoring systems). CPSs adopt wireless communications for intra-vehicular, vehicle to vehicle, and vehicle to infrastructure (e.g., a cell tower) protocols.

As used herein, the term "cryptographic algorithm" refers to a mathematical algorithm used to encrypt data. The method for encrypting and/or decrypting said data is referred to herein as a "key".

As used herein, the term "symmetric cryptographic algorithms" refers to algorithms for cryptography that employ the same key for encryption and decryption. As used herein, the term "asymmetric cryptographic algorithms" refers to algorithms for cryptography that require a pair of keys, namely, an encryption key and a separate corresponding decryption key.

As used herein, the term "entropy" is defined as the quantified value of randomness for a set of bits.

As used herein, the term "received signal strength" or "RSS" is defined as a measurement of the power present in a wireless signal.

As used herein, the term "impulse frequency response" is defined as the frequency output, or response, by a system to an impulse.

DETAILED DESCRIPTION OF THE INVENTION

Figure 1:
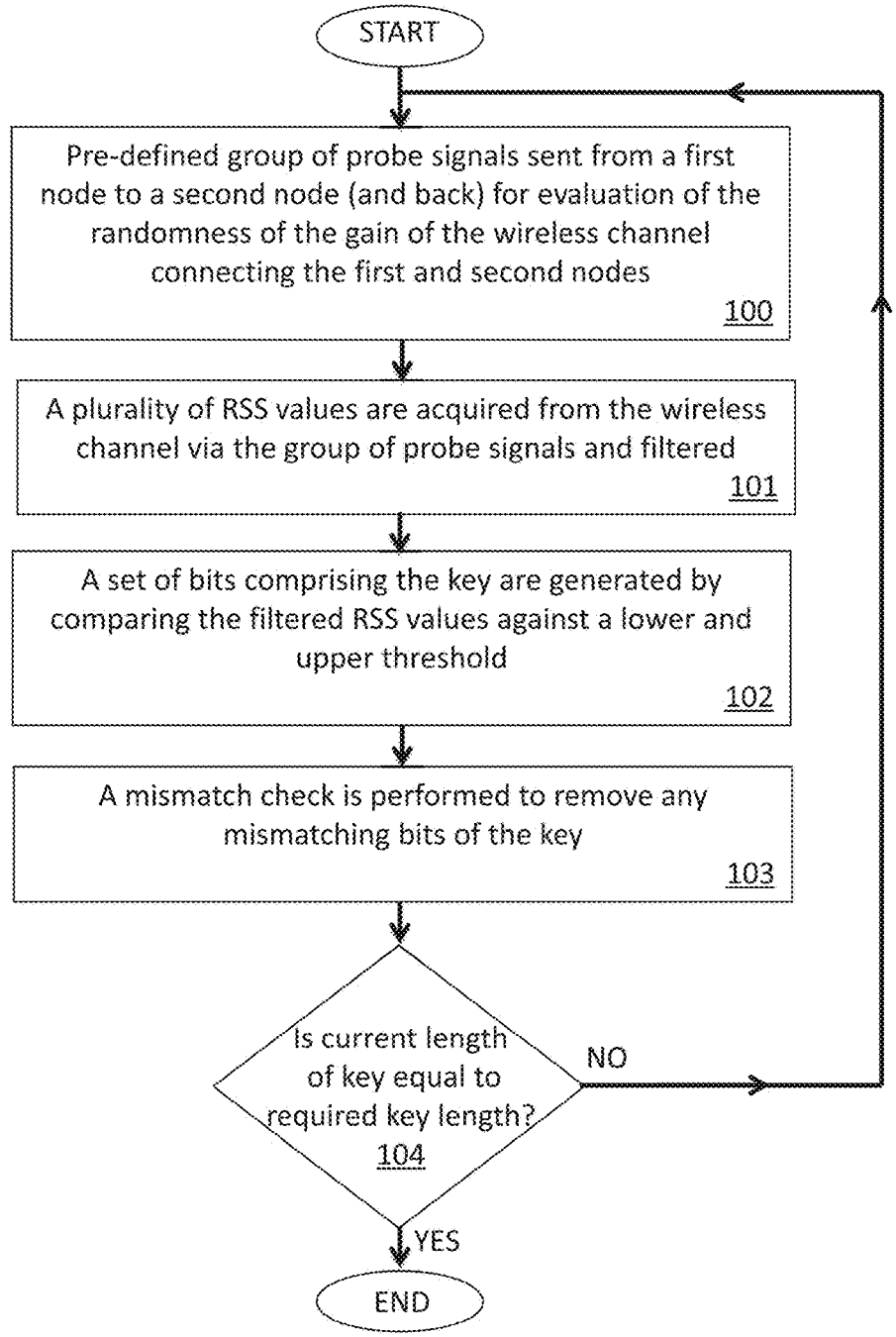
FIG. 1 shows a flowchart detailing an exemplary process for generating the key of the present invention.
Figure 2:
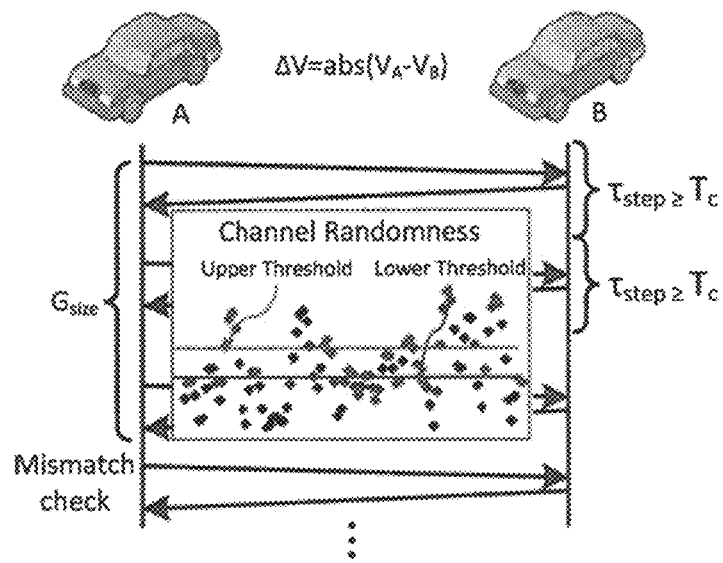
FIG. 2 shows an example of the key generation for a vehicle-to-vehicle scenario.

Referring now to FIGS. 1-14, the present invention features a method providing a key generator to effectively secure wireless automotive communications between two communication nodes. One or both nodes may be a vehicle. To illustrate, the communication may be vehicle-to-vehicle or vehicle-to-infrastructure. To further illustrate with the vehicle-to-vehicle wireless communication shown in FIG. 2, Alice's automobile (A) is communicating with Bob's automobile (B) during driving. Assume the driving speed for A and B is $V_A$ and $V_B$, respectively and the speed difference between these two moving automobiles is $\Delta V$, the coherence time, $T_c$, of the wireless communication channel between A and B may be estimated using:

$$f_d = \frac{\Delta V}{c} f_0, \quad (1)$$

$$T_c \approx \frac{0.423}{f_d}, \text{ and} \quad (2)$$

$$\Delta V = |V_A - V_B|, \quad (3)$$

where $f_d$ is the maximum Doppler frequency during the communication process, c is the speed of light, and $f_0$ is the communication frequency (see *Exploiting Wireless Channel Randomness to Generate Keys for Automotive Cyber-Physical System Security*, Wan, et. al., the entire disclosure of which is incorporated herein).

In some embodiments, a first cyber-physical system is disposed within the first communication node and a second cyber-physical system is disposed within the second communication node. Each cyber-physical system may perform an encryption and decryption of the communications transmitted over the wireless channel between the first and second communication node.

In other embodiments, in order to generate the key of length $K_{length}$, a predefined group of probe signals, of predefined size $G_{size}$, may be sent and received between a first communication node (A) and a second communication node (B) via the wireless channel (100). The group of probe signals traverse the wireless channel in order to evaluate the randomness of the channel gain and allow for a collection of a plurality of RSS values (101).

In additional embodiments, the low frequency parts of the plurality of collected RSS signals may be filtered with a high-pass filter (102) defined by its impulse frequency response with respect to time, $H_{highpass(t)}$. The filtered signal values, $RSS_{filtered}$, may contain all the information needed to extract the key of required length $K_{length}$. An upper threshold, $Th_{up}$, and a lower threshold, $Th_{lo}$, may be calculated based on the mean and variation of the plurality of filtered RSS signals. The set of bits may be generated by assigning each filtered RSS value greater than $Th_{up}$ to 1, assigning each filtered RSS value less than $Th_{lo}$ to 0, and discarding each filtered RSS value between $Th_{up}$ and $Th_{lo}$. All of the bits may then be collected and the key, having length L, is thus generated. In some embodiments, a mismatch check (103) may be performed to remove any mismatching bits of the key using the index of each bit. In other embodiments, after the key has been generated, the length of the key may be verified (104). If L is less than $K_{length}$, then the method iterates again until L is greater than or equal to $K_{length}$.

In supplementary embodiments, in order to maintain a low bit mismatch rate, each probe signal must be exchanged within the coherence time of the wireless channel. Additionally, in order to keep bits comprising the generated key unrelated, the time interval, $\tau_{step}$, between exchanging each probe signal must be no less than $T_c$. In other embodiments, the plurality of RSS signals must be collected within a time interval $G_{size} \times \tau_{step}$.

Figure 3:
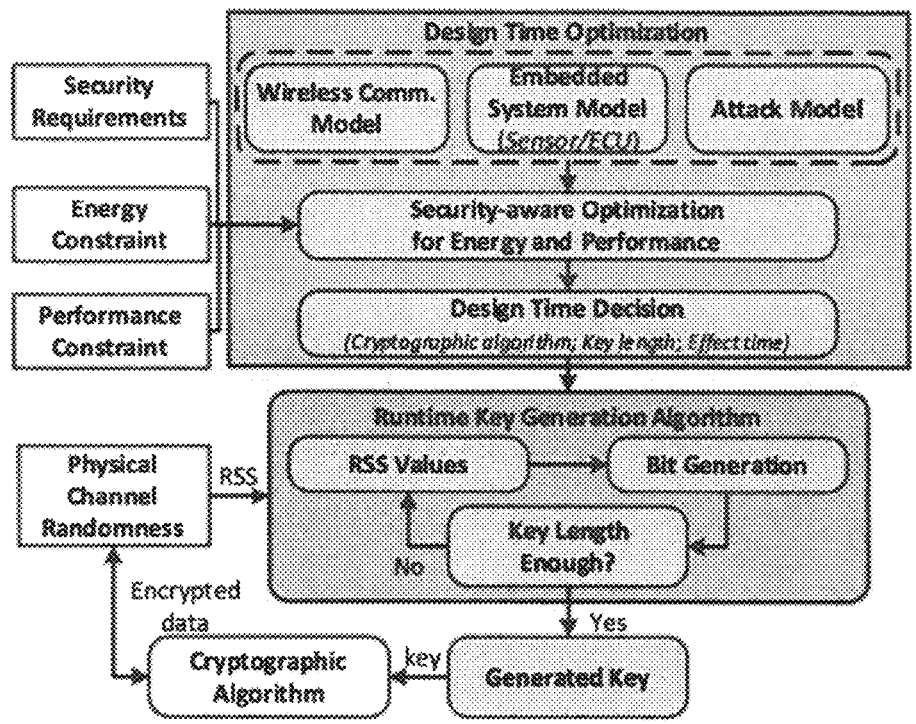
FIG. 3 shows the proposed design time optimization for automotive wireless security under energy and performance constraints.
Figure 4:
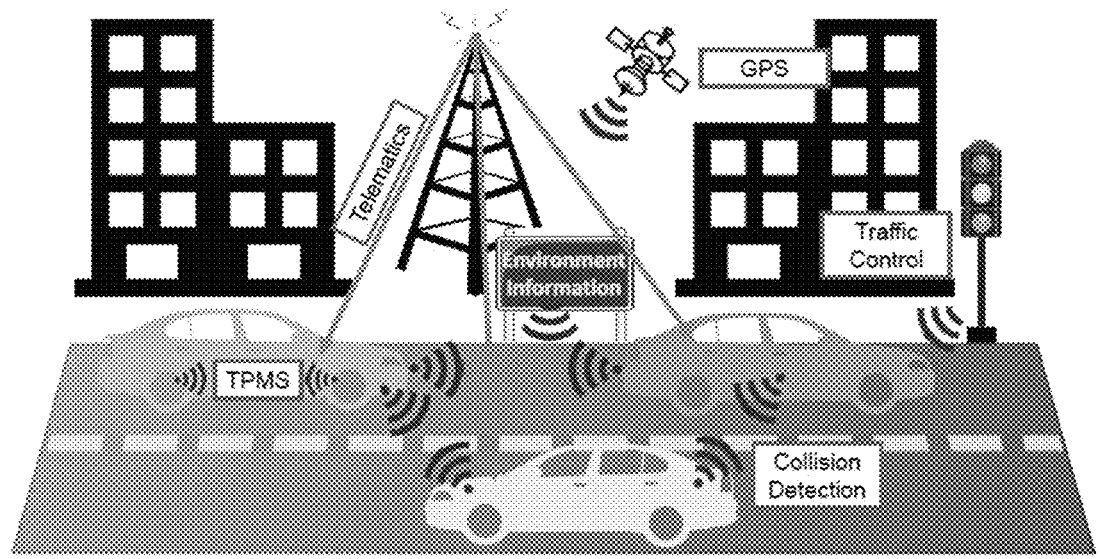
FIG. 4 shows examples of V2V and V2I applications.

The key generating method may further comprise an energy and performance-aware optimization technique. FIG. 3 illustrates an overview of the proposed design time optimization. During the design time, security-aware models for vehicle sensors and electronic control units ("ECUs"), attacks, and communications are designed. Taking these designed models together (with the given security requirements for power and performance constraints) as inputs, a heuritstic-based optimization is proposed. This optimization provides optimized values for security-related design time decisions, such as the type of cryptographic algorithm, related key length, and how long the key should be effective (or be updated). During runtime, the proposed key generation method is implemented to generate keys based on the plurality of RSS values.

Figure 14:
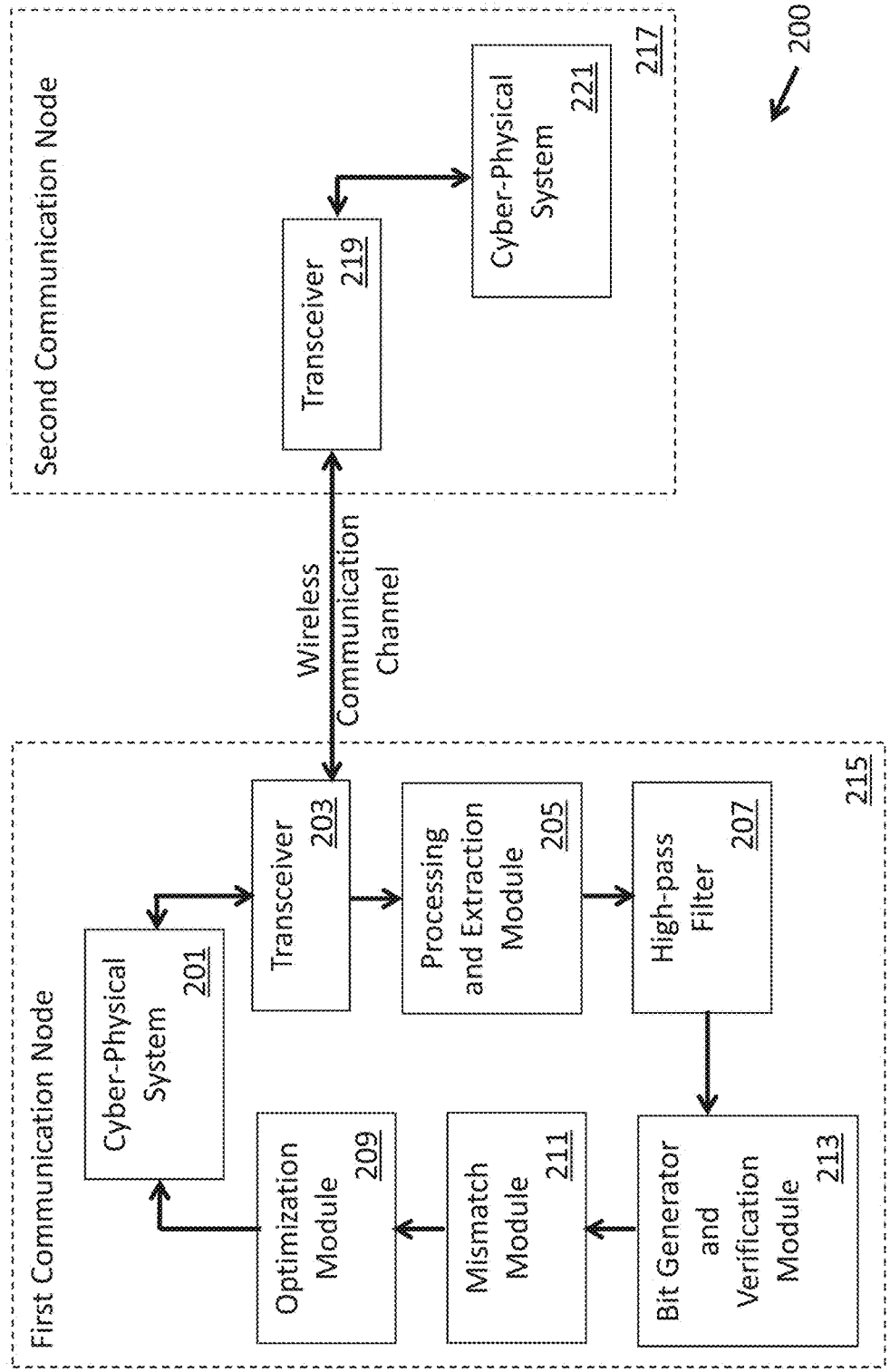
FIG. 14 shows an exemplary embodiment of the system of the present invention.

As shown in FIG. 14, the present invention further features a system (200) for generating a key to effectively secure wireless automotive communications between two communication nodes. A first cyber-physical system (201) may be disposed at the first communication node (215) and a second cyber-physical system (221) may be disposed at the second communication node (217). In some embodiments, each cyber-physical system (201, 221) may perform an encryption and decryption of the automotive communications transmitted and received between the two nodes (215, 217). In other embodiments, the system (200) features a first transceiver (203) disposed at the first communication node (215) for sending and receiving a predefined group of probe signals (100), of predefined size ("$G_{size}$"), to and from a second transceiver disposed at the second communication node via a wireless channel. The group of probe signals are sent for evaluating the randomness of a channel gain of the wireless channel.

In other embodiments, a processing and extraction module (205), operatively coupled to the first transceiver (203), is featured for the extraction of a plurality of received signal strength ("RSS") values from the wireless channel. Further, a high-pass filter (207), operatively coupled to the processing and extraction module (205), may filter the plurality of RSS signals. Each of the plurality of filtered RSS signals contain information needed to generate the key of required length, $K_{length}$. The high-pass filter (207) may be defined by an impulse frequency response of the wireless channel.

In additional embodiments, a bit generator and verification module (213) may be operatively coupled to the high-pass filter (207) for generating a set of bits. An upper threshold, $Th_{up}$, and a lower threshold, $Th_{lo}$, may be calculated based on the mean and variation of the plurality of filtered RSS signals. In some embodiments, the set of bits may be generated by assigning each filtered RSS value greater than $Th_{up}$ to 1 and assigning each filtered RSS value less than $Th_{lo}$ to 0, wherein each filtered RSS value between $Th_{up}$ and $Th_{lo}$ may be discarded. The key is generated, having length L, by collecting the set of bits.

In further embodiments, a mismatch module (211) may be operatively coupled to the bit generator and verification module (213) and perform a mismatch check to remove one or more mismatch bits from the set of bits comprising the key. Some embodiments feature an optimization module (209), which may be operatively coupled to the bit generator and verification module (213). The optimization module (209) may determine and apply an energy and performance-aware optimization. This optimization may be formulated as a linear optimization problem to be minimized, where solving the linear optimization problem provides an optimized solution for the $K_{length}$ and a time interval for which the key is effective.

In supplementary embodiments, a length, L, of the key is verified by the bit generator and verification module (213). If L is less than $K_{length}$ then the predefined group of probe signals must again be transmitted and each component in the system (200) must repeat each component function until L is greater than or equal to $K_{length}$. Once the key of appropriate size is formed, the key may be used by each cyber-physical system (201, 221) to encrypt and decrypt information communicated between the two communication nodes (215, 217).

Optimization Formulation

For a given driving profile, (including the average driving velocity $V_{drv}$, the average velocity of the communication target $V_{tar}$, the attack strength rate ("ASR") of an object attack model, the target embedded device information $Device_{type}$, and a set of available cryptographic algorithms $CA_{set}$), the present objective was to find the optimized security solution with minimized performance overhead KeyGenO H $R_p$+CryptO H $R_p$ and energy overhead while satisfying the required energy and performance constraints $C_e$ and $C_p$, respectively. Assume for each cryptographic algorithm that $CA_i$ is in the set $CA_{set}$, and the security strength rate ("SSR"), the optimization can be formulated as a linear optimization problem as follows:

$$W_1*(\text{KeyGenOHR}_p+\text{CryptOHR}_p)+W_2*(\text{KeyGenOHR}_e+\text{CryptOHR}_e),$$

where $W_1$ is the pre-defined weight performance, $W_2$ is the predefined energy overhead, KeyGenO H $R_p$ is the key generation performance overhead, KeyGenO H $R_e$ is the key generation energy overhead, CryptO H $R_p$ is the cryptographic algorithm performance overhead and CryptO H $R_e$ is the cryptographic algorithm energy overhead.

Problem constraints of the linear optimization problem are:

$$ASR<SSR_i, \qquad (i)$$

$$\text{KeyGenOHR}_p+\text{CryptOHR}_p<C_p, \text{ and} \qquad (ii)$$

$$\text{KeyGenOHR}_e+\text{CryptOHR}_e<C_e, \qquad (iii)$$

where the key generation overhead KeyGenO H $R_p$ and KeyGenO H $R_e$ are decided by the size of the generated key $K_{size}$, $T_c$, and the time interval that the generated key is effective $T_{effect}$. The cryptographic algorithm overhead, CryptO H $R_p$ and CryptO H $R_e$, are decided by $K_{size}$, $CA_i$, embedded device information $Device_{type}$, and the time interval that the cryptographic algorithm is effective $T_{effect}$. Solving this linear optimization problem can provide the optimized solution including $K_{size}$, $CA_i$, and $T_{effect}$ for the automotive wireless communication during the design time.

Results and Evaluation

Key Generation Simulation

For evaluation purposes, an automotive wireless channel model was developed together with the wireless channel-based key generation algorithm in MATLAB. The parameters for average driving speed is set to 50 miles per hour (MPH), and the coherence length for slow fading is set to 20 meters for an urban environment. The simulation evaluates the key generation time with respect to the relative speed between two communicating nodes (0 to 75 MPH in our setup). Moreover, the simulation is conducted with respect to 6 different key sizes (56, 112, 128, 168, 192, 256 bits) proposed by the security standards from the National Institute of Standards and Technology ("NIST"). The summarized simulation setup is presented in Table II.

TABLE II

Experimental Setup for Key Generation Algorithm

| | |
|---|---|
| Tested Key Length (bits) | 56, 112, 128, 168, 192, 256 |
| Relative Speed Range (MPH) | 0 to 74.56 |
| Average Speed (MPH) | 50 |
| Signal to Noise Ration (dB) | 80 [37] |

TABLE II-continued

Experimental Setup for Key Generation Algorithm

| | |
|---|---|
| Coherence Length (m) | 20 [37] |
| Group Size (bits) | 10 |

Figure 5:
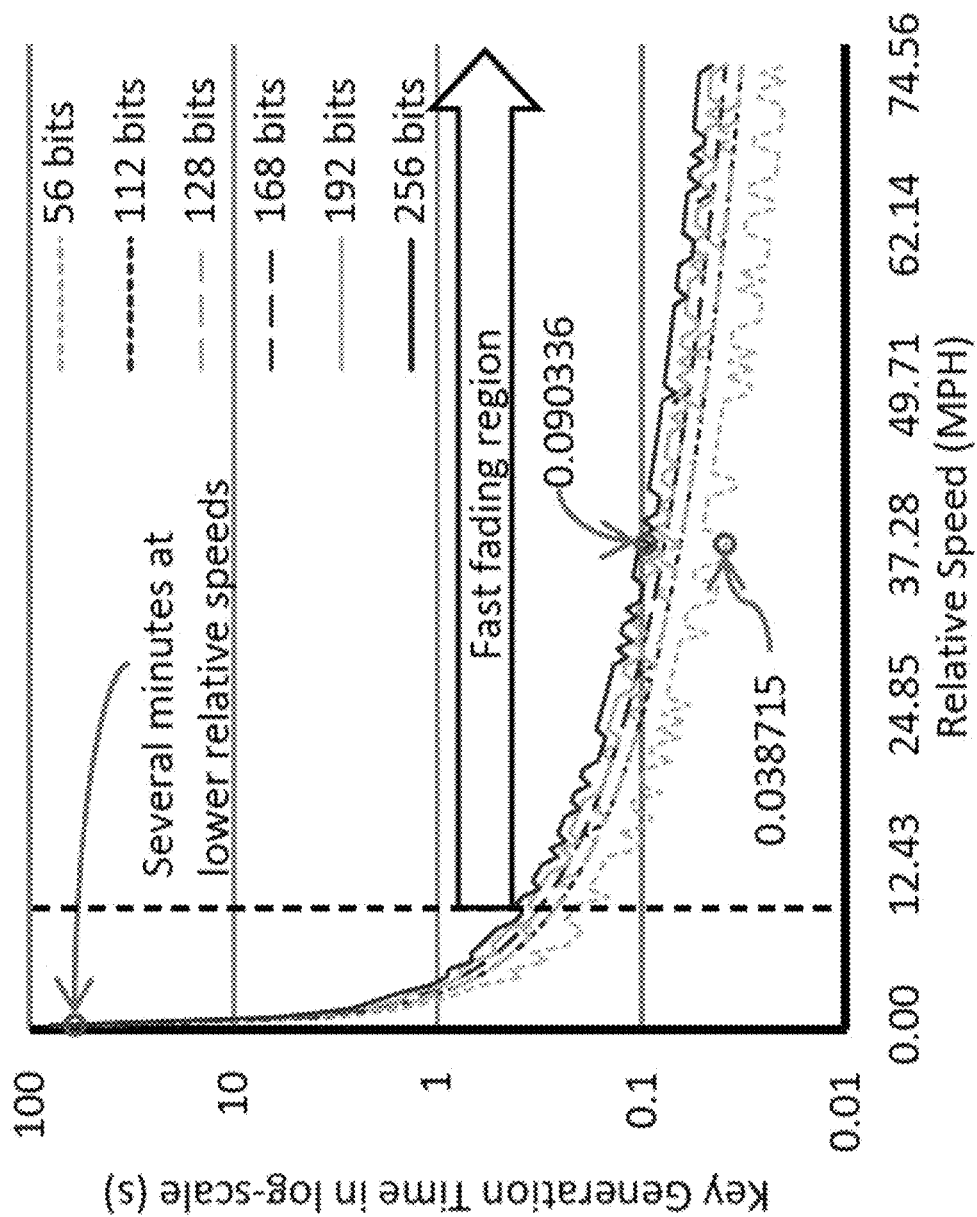
FIG. 5 shows simulation results of the key generation overhead.
Figure 6:
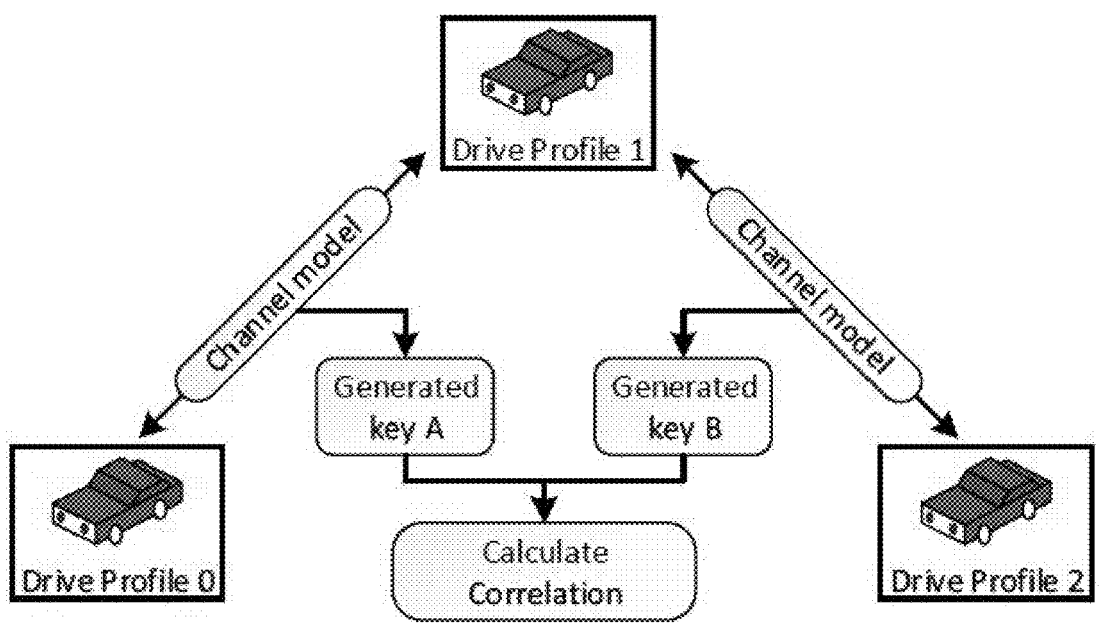
FIG. 6 shows a simulation of generating two secret keys at the same time.

As presented in FIG. 5, without wishing to limit the invention to a particular theory or mechanism, the key generation algorithm has negligible performance (10 to 100 milliseconds) overhead when the relative speed is high due to the fast fading of the wireless channel. This implies that the key generation algorithm may work well for V2V and V2I applications. On the other hand, for intra-vehicle communications where the relative speed between two nodes is around zero, simulation results show a longer key generation time (around 1 to 2 minutes). Compared to the time that the generated key will be effective, which is typically several hours to even months, several minutes can also be considered as negligible. Although in some cases, several seconds of overhead for key generation is not acceptable (e.g. safety related applications), the wireless channel-based key generation algorithm can be applicable in most of the V2V or V2I-related CPS applications.

Additionally simulations to confirm the independence of two generated keys from two different automotive wireless communication channels were conducted to demonstrate that the attacker cannot easily retrieve the key by eavesdropping. The simulation setup is presented in FIG. 6. Three automobiles (with driving profiles) are modeled and connected using the developed wireless channel models. Two wireless channel models are instantiated in the simulation, where one connects the automobile models with Drive Profile 1 and Drive Profile 0 to each other, and the other connects the automobile models with Drive Profile 1 and Drive Profile 2 with each other.

As listed in FIG. 5, per each key size, the simulation was conducted with different relative speeds. For each relative speed and key size, the simulation was run 100 times to generate two vectors of keys from two wireless channels at the same time. Then, the Pearson's correlation coefficient was calculated between these two vectors. The calculated correlation results are presented in Table III. From the simulation results, it can observed that all the correlation results are close to zero (the highest correlation value is just 0.0392). Without wishing to limit the invention to a particular theory or mechanism, these results demonstrate that the keys generated from two automobiles connecting to the same target through wireless communication are highly independent, which implies that the attacker cannot retrieve the key generated from the legitimate wireless channel.

TABLE III

Correlation Results of the Keys Generated from Two Communication Channels

| Relative speed | Key size | | | | | |
|---|---|---|---|---|---|---|
| | 56 bits | 112 bits | 128 bits | 168 bits | 192 bits | 256 bits |
| 0 km/h | 0.0102 | 0.0121 | 0.0132 | 0.0207 | 0.0305 | 0.0233 |
| 20 km/h | 0.0271 | 0.0053 | 0.0361 | 0.0221 | 0.0337 | 0.0125 |
| 40 km/h | 0.0264 | 0.0132 | 0.0026 | 0.0125 | 0.0177 | 0.0283 |
| 60 km/h | 0.0176 | 0.0177 | 0.0056 | 0.0293 | 0.0334 | 0.0268 |
| 80 km/h | 0.0039 | 0.0236 | 0.0167 | 0.0392 | 0.0147 | 0.0244 |

Experiments with Remote-Controlled ("RC") Cars

Figure 7:
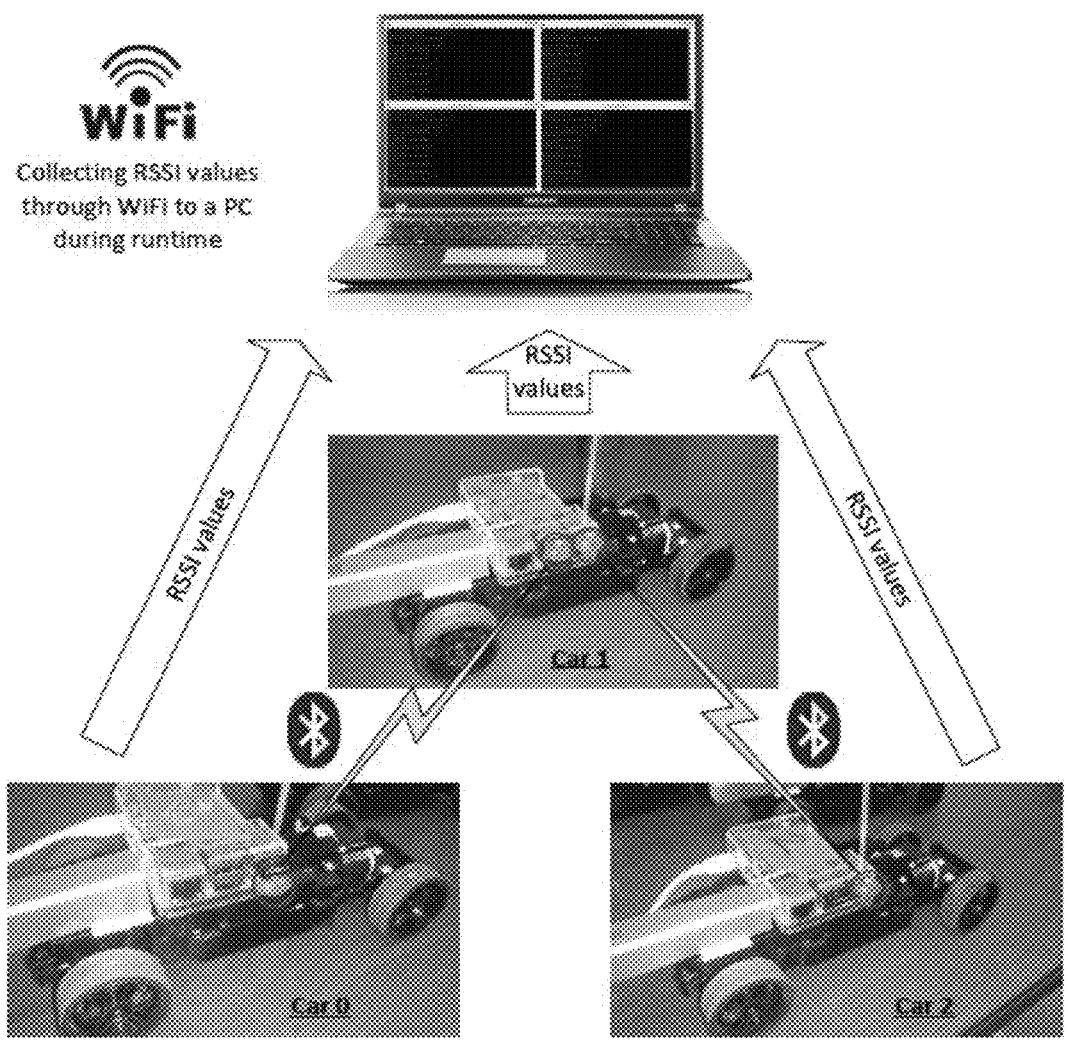
FIG. 7 shows the RC car experiment setup.

Going further than simulation, real world experiments were conducted to validate the proposed physical layer key generation technique. In the first experiment, three systems made up of RC cars and Raspberry Pis were used and connected through Bluetooth. As presented in FIG. 7, the Raspberry Pi systems were mounted on top of the RC cars. On each Raspberry Pi board, USB Bluetooth dangles were used to establish the wireless communication. In this experiment, one of the objectives was to confirm nearly zero correlation between generated keys from different wireless communication channels within a short distance, but longer than a few wavelengths. Therefore, two Bluetooth dangles were mounted on Car 1 (as shown in FIG. 7) to establish two wireless communication channels between Car 1 and Car 0, and Car 1 and Car 2. During runtime, all the Received Signal Strength Indicator (RSSI) values from each Bluetooth dangle were collected by a computer through a separate WiFi connection (as shown in FIG. 7). For each Bluetooth communication channel, RSSI values were collected from both communication nodes. Thus, in total there had been four sets of RSSI values collected from all the Bluetooth dangles. Although for this experiment a computer was used to execute the key generation algorithm and analyzed its results, the same key generation algorithm has also been implemented in the Raspberry Pis.

The experimental environment with RC cars as a slow fading one was considered because they move at low speeds (less than 5~MPH) and within a distance of 10 meters from each other in open areas with few moving objects around them.

Figure 8:
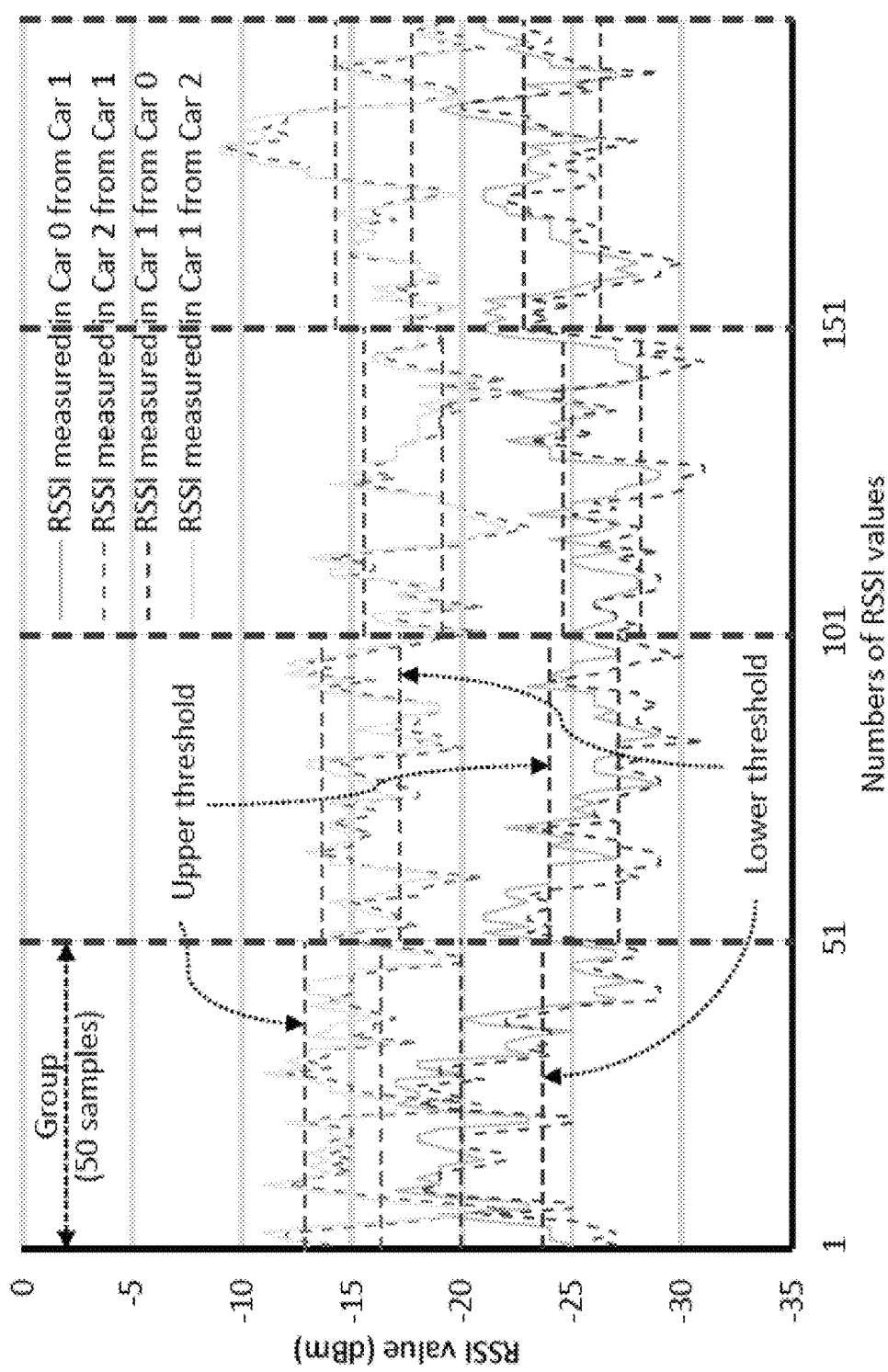
FIG. 8 shows 200 collected samples of RSSI values from the RC car experiments.
Figure 9:
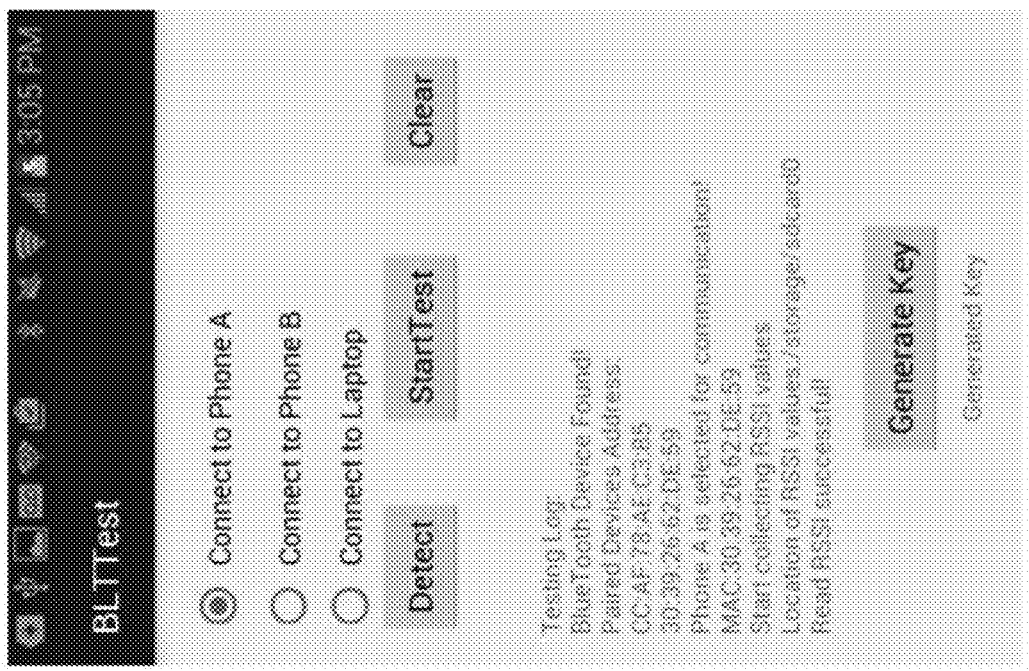
FIG. 9 shows developed applications for measuring Bluetooth RSSIs in real time.

Two hundred samples of the collected RSSI values are presented in FIG. 8. From the results, it can be easily observed that the RSSI values collected at Car 1 and Car 0 for the wireless communication between Car 1 and Car 0 are highly correlated with each other (shown in red lines). The same results also found for the wireless communication between Car 1 and Car 2 (shown in blue lines). These results clearly show the reciprocity characteristic in the wireless communication channel. Moreover, without wishing to limit the invention to a particular theory or mechanism, it was found that even with very short distances, the generated RSSI values from two different wireless communication channels have nearly zero correlation, thus supporting the assumption that an attacker that is at a position of several wavelengths distance away will experience different wireless channel characteristics, and therefore cannot obtain or predict the keys. Table IV shows the generated 64 bits of keys based on the collected 200 samples of data. Notice that 50 was used as the probe signal group size for the key generation algorithm in the present experiment.

TABLE IV

Generated 64-bit Keys from the RSSI Values

Generated 64-bit Keys

Car 1 from Car 0  1100000110000000_0000000100000110_0000000010000000_0000011111111111
Car 0 from Car 1  1100000110000000_0000000100000110_0000000010000000_0000011111111111
Car 1 from Car 2  0000001111111111_1111000000000000_0000011111100000_0000011110000011
Car 2 from Car 1  0000001111111111_1111000000000000_0000011111100000_0000011110000011

Experiments with Real Automobiles

In order to further validate that the proposed key generation technique is practical, experiments in real driving scenarios have also been performed. For the experimental purpose, the Bluetooth from laptops and android phones were used as the wireless channel for testing. Applications have been developed in both Android phones and laptops (demonstrated in FIG. 9) to measure the RSSI of the Bluetooth connection between two devices in real time.

Figure 10:
FIG. 10 shows the real world experiment using phones and laptops.
Figure 11:
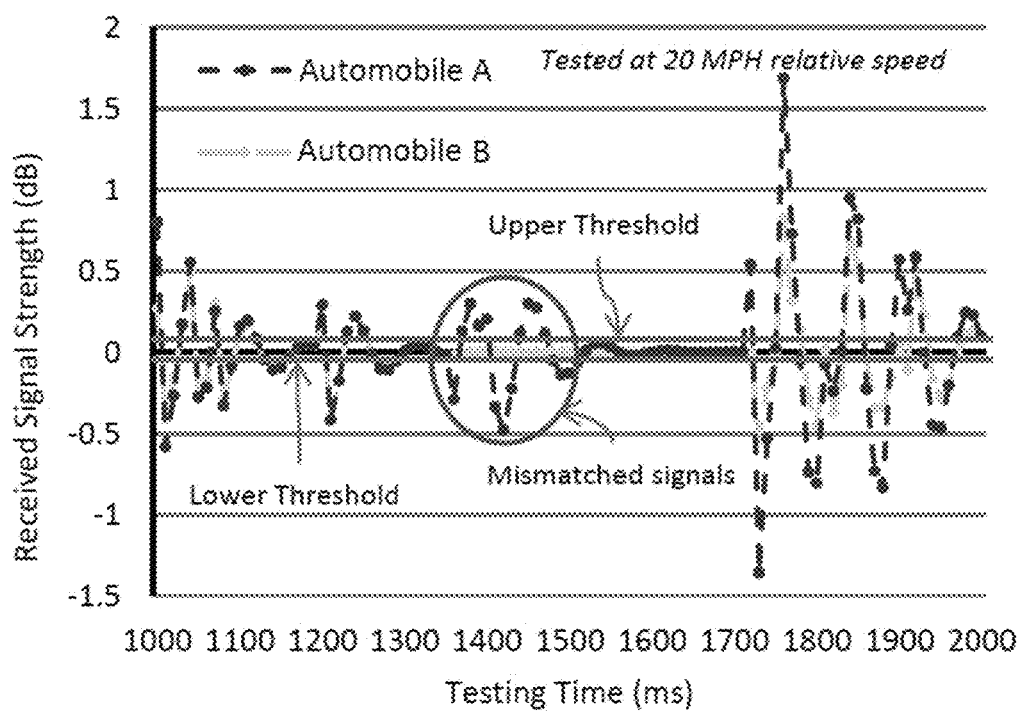
FIG. 11 shows the collected RSSIs from both the sender and the receiver.

As presented in FIG. 10, the mobile devices were placed in two automobiles, and checked the RSSI values from both automobiles in real time during the driving. Moreover, the proposed key generation algorithm was used to generate keys from the collected RSSI values. The RSSI values received from both sides of the mobile devices during a given period are displayed in FIG. 11. It may be observed that there exists several mismatched signals in FIG. 11, this is primarily because Bluetooth communication is not stable between the two last automobiles resulting in some loss of RSSI data. However, Algorithm I already considers these mismatches and handles them well. In the present experiment, the RSSI value sampling rate is 10 milliseconds due to the limitation of the Bluetooth devices (here, a mobile phone and laptop).

Figure 12:
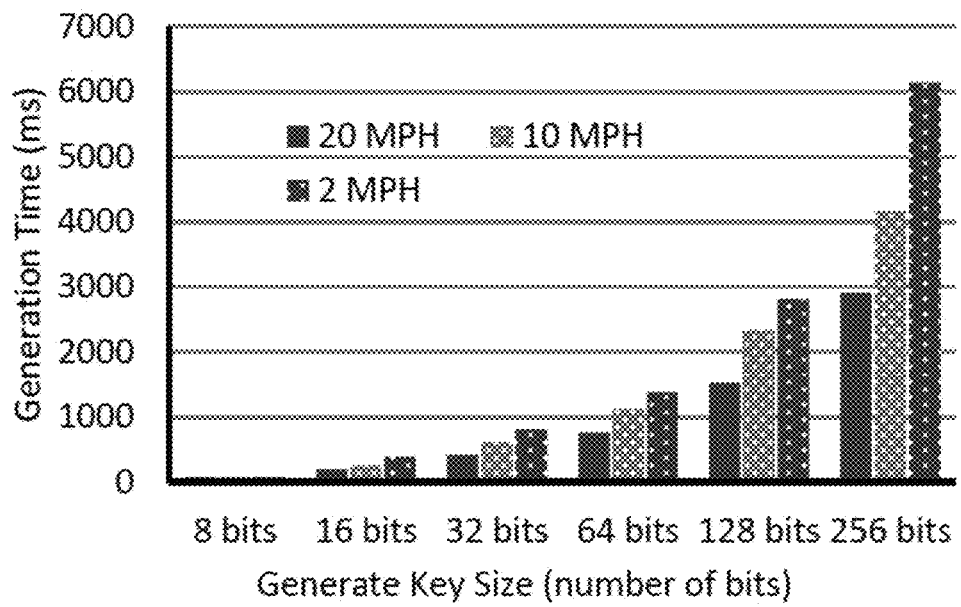
FIG. 12 shows the experimental key generation time at different speeds.

The experiments are conducted on three relative speeds of 20, 10, and 2 MPH while driving in the same direction to collect the RSSI values and to generate 6 different sizes of keys (see FIG. 12). Note that sampling takes the majority of time and the algorithm's execution time is negligible (constant).

ALGORITHM I: Algorithm for Physical Layer Key Generation of a Wireless Automotive Cyber-Physical System

```
   Input: Measured Signal Strength: RSS
   Input: Sample Time Step: τ_step
   Input: Group Size: G_size
   Input: Threshold Parameter: α
   Input: Required Key Length: L_key
   Output: Generated Key: Key
1  L = 0; Key = 0; RSS_net=∅; RSS_filtered=∅; Key_idx=∅;
2  while L < L_key do
3  |  for i=1 to G_size do
4  |  |  RSS_set = RSS_set ∪ RSS;
5  |  |  Wait(τ_step);
   |  |_
6  |  RSS_filtered = RSS_set * H_highpass(t);
7  |  MeanValue = Average Value of RSS_filtered;
8  |  Var = Variation Value of RSS_filtered;
9  |  Th_up = MeanValue + α * Var;
10 |  Th_lo = MeanValue − α * Var;
11 |  foreach RSS_i ∈ RSS_filtered do
12 |  |  if RSS_j > Th_up then
13 |  |  |  Key = (Key << 1) + 0;
14 |  |  |  L = L + 1;
15 |  |  |  Record j in Key_idx;
   |  |  |_
16 |  |  else if RSS_j < Th_lo then
17 |  |  |  Key = (Key << 1) + 1;
18 |  |  |  L = L + 1;
```

-continued

ALGORITHM I: Algorithm for Physical Layer Key Generation of a Wireless Automotive Cyber-Physical System

```
19 |  |  |  Record j in Key_idx;
   |  |  |_
   |  |_
20 |  Exchange Key_idx;
21 |  Remove mismatch bits from Key;
   |_
22 return Key;
```

Comparison to the State-of-the-Art

The current work is compared to the state-of-the-art hybrid cryptographic algorithms to evaluate the security strength, performance and code size overhead for automotive wireless communications.

Security Comparison

The security strength of the keys generated via Algorithm I were compared to those produced by the state-of-the-ad. The security strength was evaluated and compared using the proposed average min-entropy as the Key Performance Indicator (KPI).

Traditional wireless sensor communication uses pre-distributed keys for their practicality (in terms of the simplicity of the key management scheme) in achieving real-time communication. However, since the pre-distributed keys and associated algorithms are predictable, the pre-distributed key approaches have little to no entropy. In comparison to the traditional approach, state-of-the-art PUF-based approaches such as the SRAM-PUF, can generate keys with high average min-entropy.

To estimate the average min-entropy of the present key generation algorithm, the simulation was run 12800 times to generate $100*2^8=12800$ number of 8-bit keys. Based on the collected keys, the probability, $Pr_{max}$, of the key with the highest likelihood was calculated and applied to:

$$H_\infty = H_{min} = -\log(\max_{k \in K} Pr[K=k]) \quad (4)$$

where $Pr[K=k]$ is the probability of generating key $k \in K$ and H is the gain of the wireless communications channel.

Figure 13:
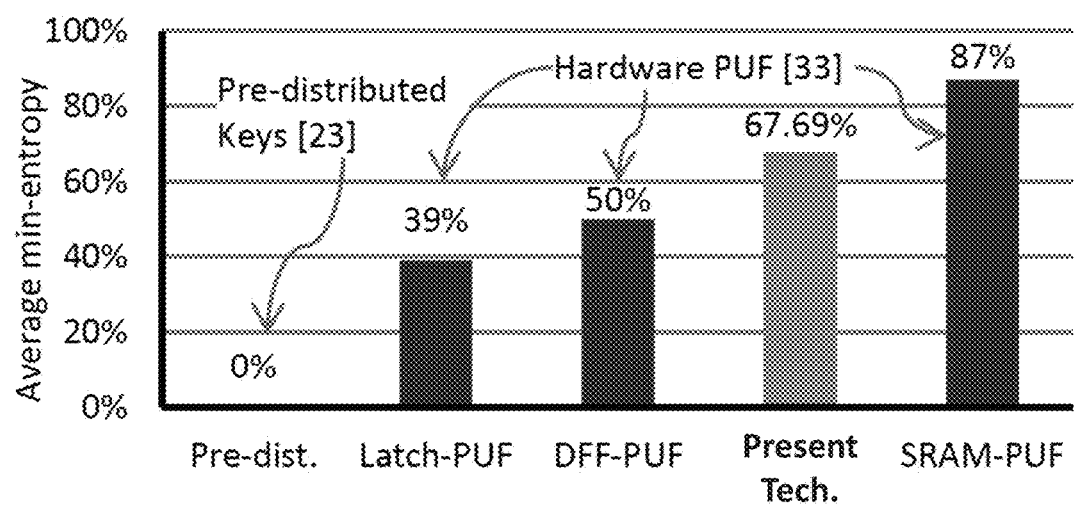
FIG. 13 shows an estimated average min-entropy results comparison.

The results in FIG. 13 show the average min-entropy of the present technique and compares it with other well-known techniques such as pre-distributed keys, Latch-PUFs, DFF-PUFs, and SRAM-PUFs. Note that the algorithm of the present invention can generate keys with security strength close to that of some of the best PUF-based approaches (up to 67% average min-entropy for 8-bit keys, where the average min-entropy increases with the respect to the size of the key). Although some of the PUF-based approaches (e.g. SRAM-PUF) can generate keys with higher average min-entropy (since the number of 0 and 1 bits tend to be around the same), the present algorithm has the advantage of generating keys by directly accessing the communication channel without needing a special physical process such as SRAM rebooting (for SRAM-PUFs). While the average min-entropy (67%) is not as high as some of the PUF-based approaches, it can be easily increased by adding hardware or algorithm improvements.

Performance Overhead Comparison

From the performance point of view, it is known that wireless channel-based key generation algorithm has the advantage of not needing the time-consuming key exchange step of asymmetric and hybrid techniques. Thus, the time of the present key generation algorithm was compared to the execution time of two of the most popular asymmetric cryptographic algorithms (RSA and ECC) used in hybrid solutions. The comparison is conducted given two different NIST security strength (80 and 112 bits) requirements. The key generation time for two different relative speeds (2 MPH and 20 MPH) collected from experiments was used as the algorithm's performance. For the execution time of RSA and ECC algorithms, the implementation of these two algorithms on an 8-bit embedded processor (ATmega128) are used as reference, which is widely used in modern wireless sensor networks. The results listed in FIG. 7 show that the present algorithm can generate/exchange keys 10× faster than the RSA algorithm and 1 to 2× faster than ECC algorithm. Notice that in this comparison, only the present algorithm is compared, which solves both the key generate and exchange problems at the same time, to the key exchange process in the hybrid algorithm.

Code Size Overhead Comparison

In order to evaluate the overhead from the memory size point of view, the code size of the present algorithm was compared to sizes of implemented RSA and ECC algorithms. For a fair comparison, the code of the proposed key generation algorithm was cross-compiled to make it suitable for the same 8-bit processor and to get a valid code size. As shown in Table V, the algorithm ("Our Alga") of the present invention in comparison is 10× smaller than the size of ECC code and is 20× smaller than the size of the RSA code.

TABLE V

Performance and Code Size Overhead Comparisons on an 8-bit Processor

| Security Strength | Performance Overhead (Seconds) | | | | Code Size Overhead (Bytes) | | |
| --- | --- | --- | --- | --- | --- | --- | --- |
| | RSA [11] | ECC [11] | Our Alg. (2 MPH) | Our Alg. (20 MPH) | RSA [11] | ECC [11] | Our Alg. |
| 80 bits | 11.42 | 1.62 | 1.725 | 0.95 | 6292 | 3682 | 331 |
| 112 bits | 85.2 | 4.38 | 2.415 | 1.33 | 7736 | 4812 | 331 |

Discussions/Conclusions

Key Generation Time

From both the simulation and experiment results, it can be seen that the key generation time using the proposed key generation algorithm may vary from a few milliseconds to several seconds depending on the automobile speed and key size. However, some differences exist between the experimental and simulation results because the fast-fading and slow-fading models used for simulation cannot precisely model some realistic environments. For example, the results from simulations of different environments might be the similar but for experiments in different environments, results will tend to not be the same. Another significant reason for this is that the current implementation has a limitation on the sampling rate of the RSSI signal due to the use of applications such as Bluetooth. If the coherence time is smaller than the sampling time (time interval between two RSSI samples), the ideal key generation time, which is computed in the present simulations, cannot be achieved.

Nevertheless, the experimental results demonstrate that a physical layer key generation technique is practical for automotive CPS. For example, the non-safety critical applications such as traffic management generally will have a response time up to few minutes, while for safety related applications, the response time requirement may vary from seconds to hundreds of milliseconds. The experimental results have already shown that the proposed technique can fulfill both of these timing requirements. Critical applications with stringent timing requirements (such as collision detection in V2V communication) may require a response time of around 50 milliseconds. However, this type of communication period is typically short and suggests that no large key size is required, which the proposed algorithm can comfortably and quickly compute. Moreover, since the relative speed between automobiles is typically high in real case, the present simulation results demonstrate that it is possible to quickly generate keys within a few milliseconds. Compared to the present key generation approach, the state-of-the-art hybrid key generation approach is more costly and may require an expensive high-frequency processor or particular hardware accelerator to meet the real-time requirements of the safety critical applications.

Correlation of Generated Keys from Different Channels

The fundamental assumption of this invention is based on the theory that two wireless channels that are at least a few wavelengths apart are independent of each other. Although this is mostly a theoretical approach, researchers are recently performing experiments to prove that the two channels may not necessarily be completely independent. In the present work, simulation results have shown that in automotive wireless communication systems, the correlation between two wireless channels is close to zero due to the high relative speeds of the automotive environment. More importantly, experiments with RC cars to demonstrate that, in the real world, this assumption is valid for automotive wireless communication even when the two communication channels are close to each other (within 10 meters) and the relative speed between the automobiles is very low (less than 5 MPH). Arguably, an attacker can get around this by attaching devices (less than a few wavelengths) extremely close to the wireless nodes on the automobile in order to receive similar channel properties and information. Nonetheless, for automotive environments, this can be tremendously difficult considering the required proximity to the wireless nodes and financial duress to be successful.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions

What is claimed is:

1. A method of generating a key to effectively secure wireless communications between a first communication node and a second communication node, wherein a first cyber-physical system is disposed within the first communication node and a second cyber-physical system is disposed within the second communication node, wherein each cyber-physical system performs an encryption and decryption of said wireless communications, wherein the method comprises:
   a. sending and receiving a predefined group of probe signals, of predefined size ("$G_{size}$"), between the first communication node and the second communication node via a wireless channel, wherein the group of probe signals are sent for evaluating randomness of a channel gain of the wireless channel;
   b. collecting a plurality of received signal strength ("RSS") values from the wireless channel;
   c. obtaining a plurality of filtered RSS values by filtering the plurality of RSS values with a high-pass filter defined by an impulse frequency response of the wireless channel, wherein the plurality of filtered RSS values contain information needed to generate the key of required length, $K_{length}$;
   d. generating a set of bits, comprising:
      i. calculating an upper threshold, $Th_{up}$, and a lower threshold, $Th_{lo}$, based on a mean and a variation of the plurality of filtered RSS values; and
      ii. assigning each filtered RSS value greater than $Th_{up}$ to 1 and assigning each filtered RSS value less than $Th_{lo}$ to 0, wherein each filtered RSS value between $Th_{up}$ and $Th_{lo}$ is discarded;
   e. generating the key having a length L, by collecting the set of bits; and
   f. verifying a length, L, of the key (104), wherein if L is less than $K_{length}$, then steps a-f are repeated until L is greater than or equal to $K_{length}$,
wherein the key is used by the first and second cyber-physical systems to encrypt and decrypt the wireless communications between the first and second communication nodes.

2. The method of claim 1, wherein each probe signal is exchanged within a time period less than a coherence time ("$T_c$") of the wireless channel between the first communication node and the second communication node.

3. The method of claim 2, wherein a time interval ("$\tau_{step}$") between exchanging each probe signal is not less than $T_c$.

4. The method of claim 3, wherein the plurality of RSS values are collected within time period defined by $G_{size} \times \tau_{step}$.

5. The method of claim 1 further comprising performing a mismatch check to remove one or more mismatch bits from the set of bits.

6. The method of claim 1 further comprising determining an energy and performance-aware optimization, wherein said optimization is formulated as a linear optimization problem to be minimized:

$W_1*(KeyGenOHR_p + CryptOHR_p) + W_2*(KeyGenOHR_e + CryptOHR_e)$, wherein $W_1$ is a pre-defined weight performance, $W_2$ is a predefined energy overhead, $KeyGenO H R_p$ is a key generation performance overhead, $KeyGenO H R_e$ is a key generation energy overhead, $CryptO H R_p$ is a cryptographic algorithm performance overhead and $CryptO H R_e$ is a cryptographic algorithm energy overhead, wherein solving the linear optimization problem provides an optimized solution for the cryptographic algorithm, the $K_{length}$, and a time interval for which the cryptographic algorithm or the key is effective.

7. The method of claim 1, wherein the first communication node is a vehicle or infrastructure.

8. The method of claim 1, wherein the second communication node is a vehicle or infrastructure.

9. A system (200) for generating a key to effectively secure wireless communications between a first communication node (215) and a second communication node (217), wherein a first cyber-physical system (201) is disposed at the first communication node (215) and a second cyber-physical system (221) is disposed at the second communication node (217), wherein each cyber-physical system performs an encryption and decryption of said wireless communications, wherein the system (200) comprises:
   a. a first transceiver (203) disposed at the first communication node (215);
   b. a second transceiver (219) disposed at the second communication node (217), wherein the second transceiver (219) is linked to the first transceiver (203) by a wireless channel;
   c. a processor, operatively coupled to the first transceiver (203); and
   d. a memory operatively coupled to the processor, configured to store digitally-encoded instructions that, when executed by the processor, cause the processor to perform operations comprising:
      i. sending and receiving a predefined group of probe signals of predefined size ("$G_{size}$"), between the first transceiver (203) and the second transceiver (219) via the wireless channel, wherein the group of probe signals are sent for evaluating randomness of a channel gain of the wireless channel;
      ii. collecting a plurality of received signal strength ("RSS") values from the wireless channel;
      iii. obtaining a plurality of filtered RSS values by filtering the plurality of RSS values with a high-pass filter defined by an impulse frequency response of the wireless channel, wherein the plurality of filtered RSS values contain information needed to generate the key of required length, $K_{length}$;
      iv. generating a set of bits, comprising:
         A. calculating an upper threshold, $Th_{up}$, and a lower threshold, $Th_{lo}$, based on a mean and a variation of the plurality of filtered RSS values; and
         B. assigning each filtered RSS value greater than $Th_{up}$ to 1 and assigning each filtered RSS value less than $Th_{lo}$ to 0, wherein each filtered RSS value between $Th_{up}$ and $Th_{lo}$ is discarded;
      v. generating the key having a length L, by collecting the set of bits;
      vi. performing a mismatch check to remove one or more mismatch bits from the set of bits of the key;
      vii. determining and applying an energy and performance-aware optimization, wherein said optimization is formulated as a linear optimization problem to be minimized, wherein solving the linear optimization problem provides an optimized solution for the $K_{length}$ and a time interval for which the key is effective; and viii. verifying a length, L, of the key, wherein if L is less than $K_{length}$, then steps i-viii are repeated until L is greater than or equal to $K_{length}$;

wherein the key is used by the first and second cyber-physical systems (201, 221) to encrypt and decrypt the wireless communications between the first and second communication nodes (215, 217).

10. The system of claim 9, wherein each probe signal is exchanged within a time period less than a coherence time ("$T_c$") of the wireless channel between the first communication node and the second communication node, wherein a time interval ("$\tau_{step}$") between exchanging each probe signal is not less than $T_c$.

11. The system of claim 10, wherein the plurality of RSS values are collected within time period defined by $G_{size} \times \tau_{step}$.

12. The system of claim 9, wherein said linear optimization problem to be minimized is:

$$W_1*(\text{KeyGenOHR}_p+\text{CryptOHR}_p)+W_2*(\text{KeyGenOHR}_e+\text{CryptOHR}_e),$$

wherein $W_1$ is a pre-defined weight performance, $W_2$ is a predefined energy overhead, KeyGenO H $R_p$ is a key generation performance overhead, KeyGenO H $R_e$ is a key generation energy overhead, CryptO H $R_p$ is a cryptographic algorithm performance overhead and CryptO H $R_e$ is a cryptographic algorithm energy overhead, wherein solving the linear optimization problem provides an optimized solution for the cryptographic algorithm, the $K_{length}$, and a time interval for which the cryptographic algorithm or the key is effective.

13. A system (200) for generating a key to effectively secure wireless communications between a first communication node (215) and a second communication node (217), wherein a first cyber-physical system (201) is disposed at the first communication node (215) and a second cyber-physical system (221) is disposed at the second communication node (217), wherein each cyber-physical system performs an encryption and decryption of said wireless communications, wherein the system (200) comprises:

a. a first transceiver (203) disposed at the first communication node (215);

b. a second transceiver (219) disposed at the second communication node (217), wherein the second transceiver (219) is linked to the first transceiver (203) by a wireless channel;

c. a processor, operatively coupled to the first transceiver (203); and d. a memory operatively coupled to the processor, configured to store digitally-encoded instructions that, when executed by the processor, cause the processor to perform operations comprising:

i. sending and receiving a predefined group of probe signals, of predefined size ("$G_{size}$"), between the first transceiver (203) and the second transceiver (219) via the wireless channel, wherein the group of probe signals are sent for evaluating randomness of a channel gain of the wireless channel;

ii. collecting a plurality of received signal strength ("RSS") values from the wireless channel;

iii. obtaining a plurality of filtered RSS values by filtering the plurality of RSS values with a high-pass filter defined by an impulse frequency response of the wireless channel, wherein the plurality of filtered RSS values contain information needed to generate the key of required length, $K_{length}$;

iv. generating a set of bits, comprising:

A. calculating an upper threshold, $Th_{up}$, and a lower threshold, $Th_{lo}$, based on a mean and a variation of the plurality of filtered RSS values; and B. assigning each filtered RSS value greater than $Th_{up}$ to 1 and assigning each filtered RSS value less than $Th_{lo}$ to 0, wherein each filtered RSS value between $Th_{up}$ and $Th_{lo}$ is discarded;

v. generating the key having a length L, by collecting the set of bits; and vi. verifying a length, L, of the key, wherein if L is less than $K_{length}$, then steps i-ix are repeated until L is greater than or equal to $K_{length}$;

wherein the key is used by the first and second cyber-physical systems (201, 221) to encrypt and decrypt the wireless communications between the first and second communication nodes (215, 217).

14. The system of claim 13, wherein each probe signal is exchanged within a time period less than a coherence time ("$T_c$") of the wireless channel between the first communication node and the second communication node.

15. The system of claim 14, wherein a time interval ("$\tau_{step}$") between exchanging each probe signal is not less than $T_c$.

16. The system of claim 15, wherein the plurality of RSS values are collected within time period defined by $G_{size} \times \tau_{step}$.

17. The system of claim 13, wherein operations performed by the processor further comprises performing a mismatch check to remove one or more mismatch bits from the set of bits of the key.

18. The system of claim 13, wherein operations performed by the processor further comprises determining and applying an energy and performance-aware optimization, wherein said optimization is formulated as a linear optimization problem to be minimized, wherein said linear optimization problem to be minimized is:

$$W_1*(\text{KeyGenOHR}_p+\text{CryptOHR}_p)+W_2*(\text{KeyGenOHR}_e+\text{CryptOHR}_e),$$

wherein $W_1$ is a pre-defined weight performance, $W_2$ is a predefined energy overhead, KeyGenO H $R_p$ is a key generation performance overhead, KeyGenO H $R_e$ is a key generation energy overhead, CryptO H $R_p$ is a cryptographic algorithm performance overhead and CryptO H $R_e$ is a cryptographic algorithm energy overhead, wherein solving the linear optimization problem provides an optimized solution for the cryptographic algorithm, the $K_{length}$, and a time interval for which the cryptographic algorithm or the key is effective.

19. The system of claim 13, wherein the first communication node is a vehicle or infrastructure.

20. The system of claim 13, wherein the second communication node is a vehicle or infrastructure.

* * * * *